Aug. 30, 1932.  F. MOSSBERG ET AL  1,875,104
SKID
Filed April 26, 1930
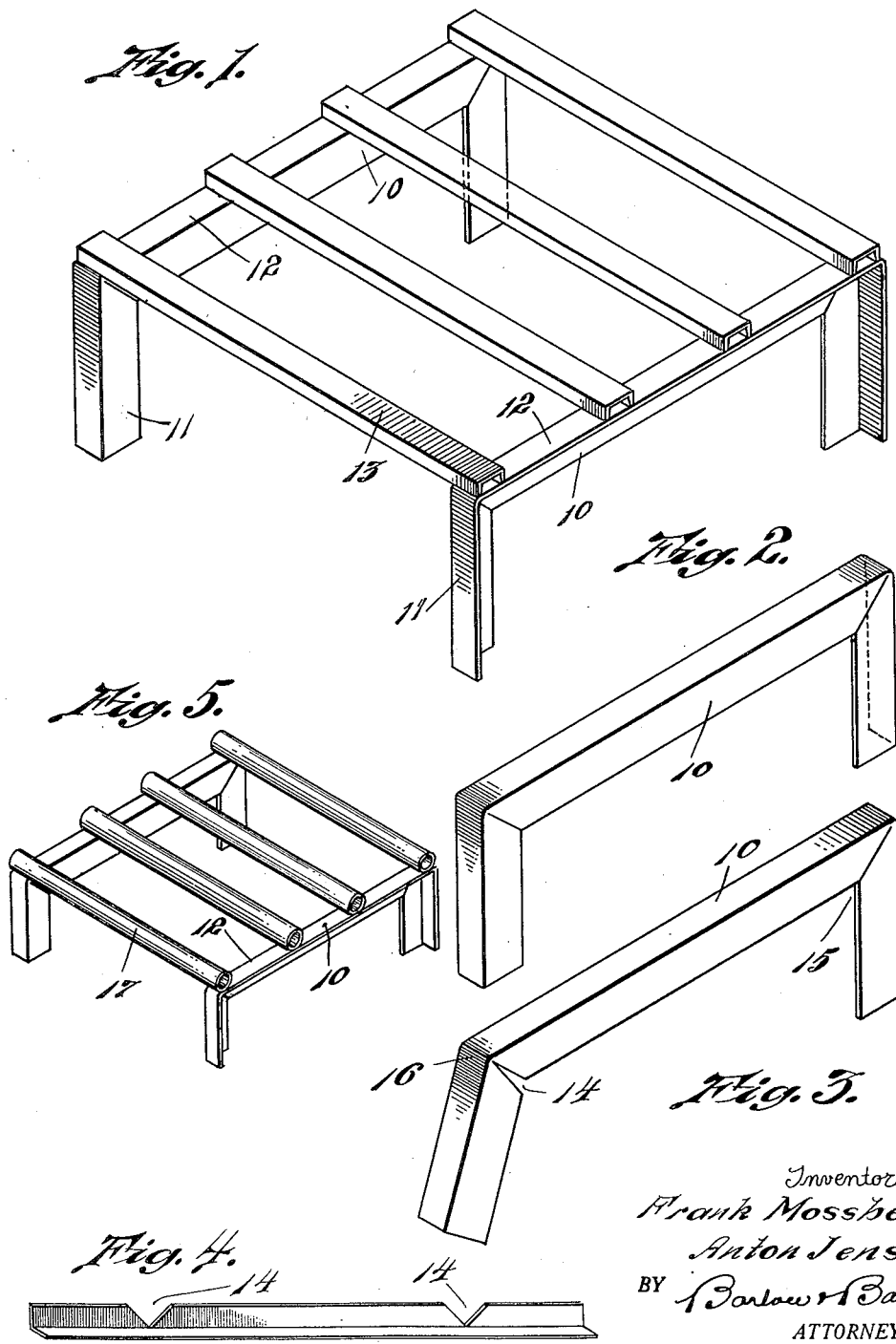

Patented Aug. 30, 1932

1,875,104

UNITED STATES PATENT OFFICE

FRANK MOSSBERG AND ANTON JENSEN, OF ATTLEBORO, MASSACHUSETTS, ASSIGNORS TO MOSSBERG PRESSED STEEL CORPORATION, OF ATTLEBORO, MASSACHUSETTS, A CORPORATION OF MASSACHUSETTS

SKID

Application filed April 26, 1930. Serial No. 447,536.

Our present invention relates to skids for use in connection with lifting trucks for handling material in factories and the like.

Skids for this use have heretofore been made of pieces of sheet metal bent in the form of large channels, and in the form of wooden platforms equipped with iron legs. These types of construction have heretofore been heavy and expensive to manufacture, since the skids must be able to support heavy loads. The principal object of our invention is to so simplify the skid construction that the amount of material used and the labor required for manufacturing the skid is reduced, while the load carrying capacity of the skid is increased, in proportion to the weight of the material used.

The skids heretofore used are also difficult to stack closely, since they must be stacked in pairs that face towards each other, thus increasing the storing and the shipping space required. Another object of our invention is to provide a skid construction which facilitates very close stacking.

With these and other objects and advantageous features in view, the invention consists of a novel arrangement of parts more fully described in the detailed description following, in conjunction with the accompanying drawing, and more particularly defined in the appended claim.

In the drawing:

Fig. 1 is a perspective view of the novel skid;

Fig. 2 is a perspective view of one side standard;

Fig. 3 shows the method of forming the side standard;

Fig. 4 is a view of an angle bar notched preparatory to bending for forming a side standard; and Fig. 5 is a perspective view of a modified form of skid utilizing a pipe flooring.

It has been found desirable in the manufacture of skids to utilize an inexpensive construction of standard metal bars, thus reducing the amount of material, the weight, and the labor required for manufacturing, while at the same time increasing the strength, the portability and the convenience of the completed skids. We have therefore devised a skid having angle iron side standards and a channel bar flooring, the channel bars being spaced apart and welded at their ends to the separated side standards to form an open flooring with the channel bar bases uppermost; and the following is a detailed description of a preferred construction which illustrates the principles of my invention.

Referring to the drawing, the skid includes two spaced side standards 10, each comprising legs 11 and a base portion 12, and joined by a number of spaced channel bars 13 which are welded at their ends to the base portions 12, preferably by welding the walls of the channel bars to the base portions 12. This construction provides a flat flooring or skid top formed of the spaced bases of the channel bars.

Each side standard 10 is preferably formed of a single angle bar, one side being angularly cut or notched as at 14, 15 so that the other side may be bent as indicated at 16 with the edges of the cut or notch meeting to complete the side standard. If desired, the contiguous edges of the cut or notch may be joined by welding or the like.

If preferred, circular bars 17 such as pipe lengths may be used instead of the channel bars 13, as shown in Figure 4, the pipe lengths being welded at their ends to the base portions 12 of the side standards. This construction is suitable for supporting loads which are preferably slid off the skids.

The improved skid is inexpensive to manufacture, is strong and sturdy and at the same time light and easily handled, and is easily stacked in numbers, the legs of one passing through the top bar spacings to take up very little space.

While we have described preferred constructional embodiments of our invention, it is obvious that desired changes in arrangement and in construction may be made, within the spirit and the scope of the invention as defined in the appended claim.

We claim:

A metallic skid adapted to be stacked, comprising spaced side standards of angle iron, each having a base portion and integral right angularly depending legs, and channel bars welded to said base portions, said channel bars having their flat portions uppermost and spaced apart sufficiently to permit a depending leg of a similar superimposed structure to be disposed between adjacent channel bars, and with the other legs of the superimposed structure outside the periphery of the skid.

In testimony whereof we affix our signatures.

FRANK MOSSBERG.
ANTON JENSEN.